Aug. 18, 1936.   P. H. DAVEY   2,051,784
POWER TAKE-OFF AND ASSOCIATED MECHANISM
Filed Dec. 18, 1933   5 Sheets-Sheet 1
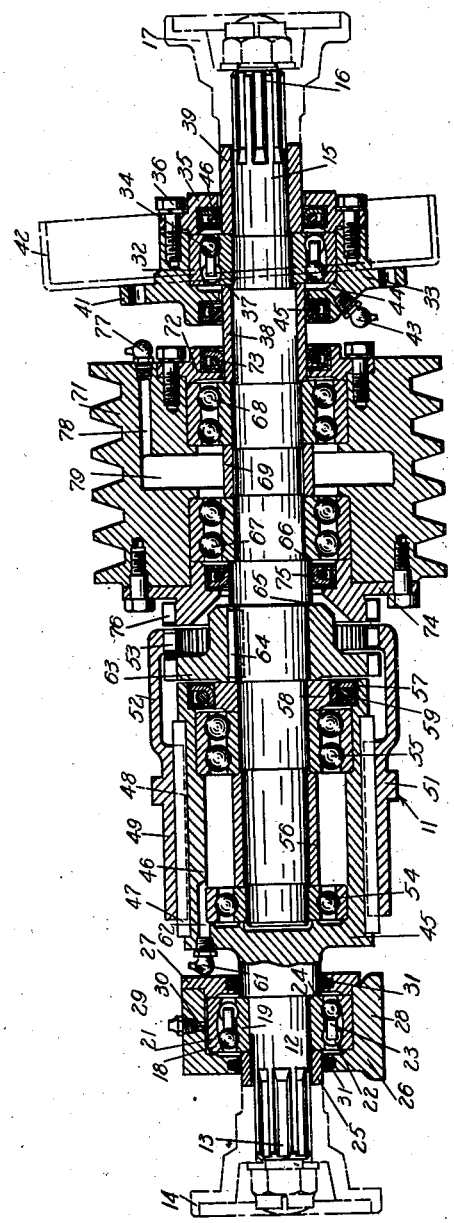
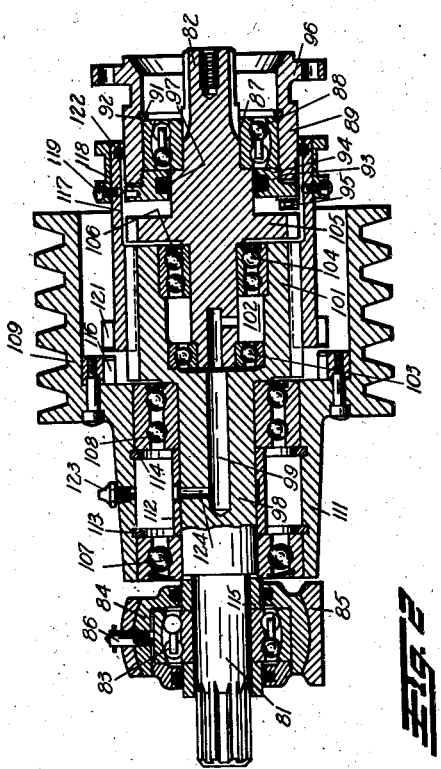
Inventor
Paul H. Davey
By Strauch + Hoffman
Attorneys

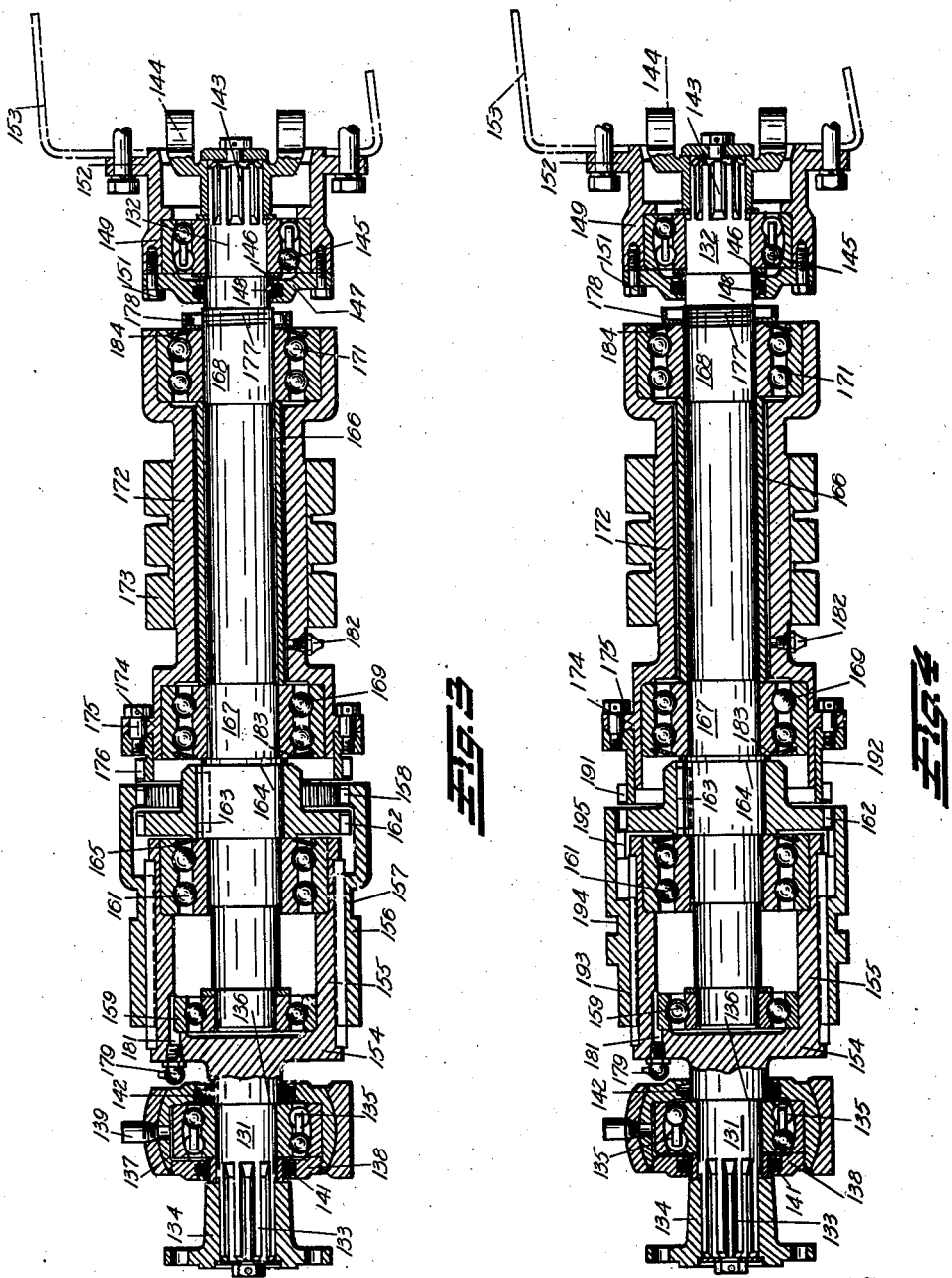

Aug. 18, 1936.　　　　P. H. DAVEY　　　　2,051,784
POWER TAKE-OFF AND ASSOCIATED MECHANISM
Filed Dec. 18, 1933　　　5 Sheets-Sheet 3
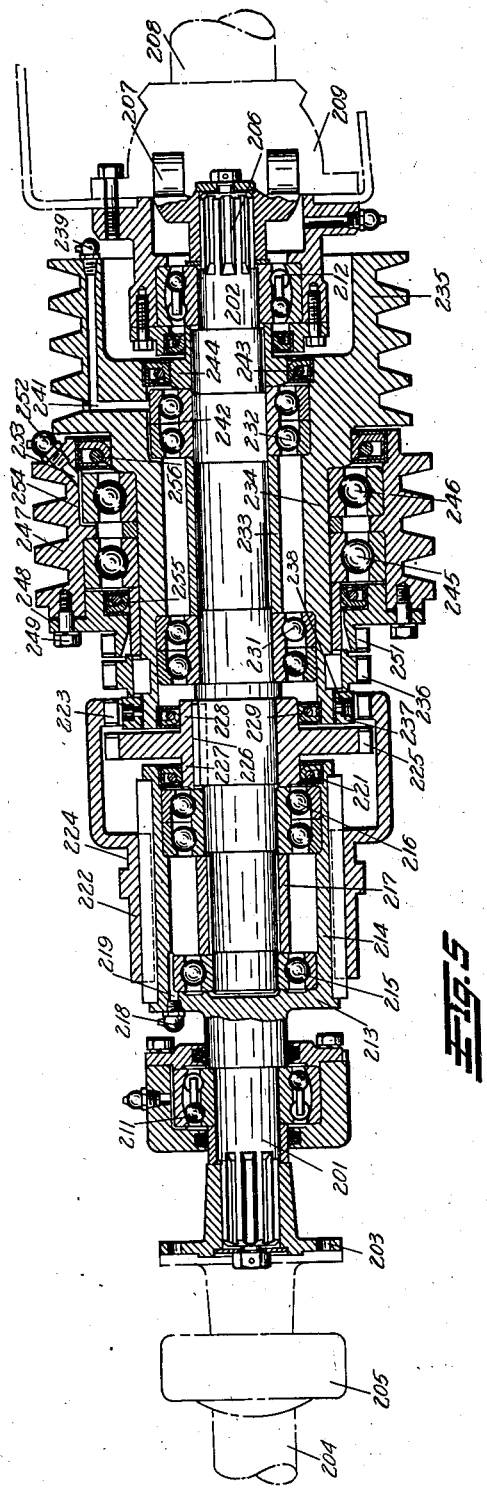
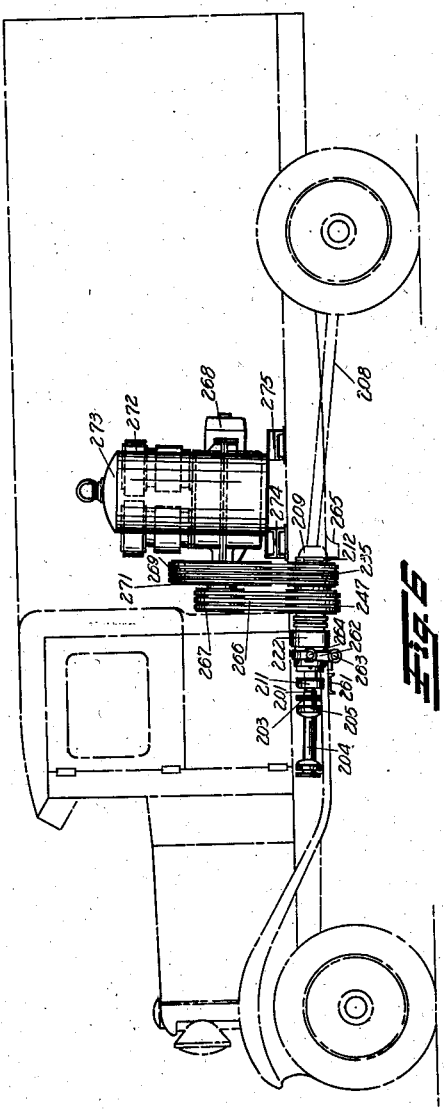
Inventor
Paul H. Davey
By Strauch + Hoffman
Attorneys Inventor
Paul H Davey
By Strauch & Hoffman
Attorneys

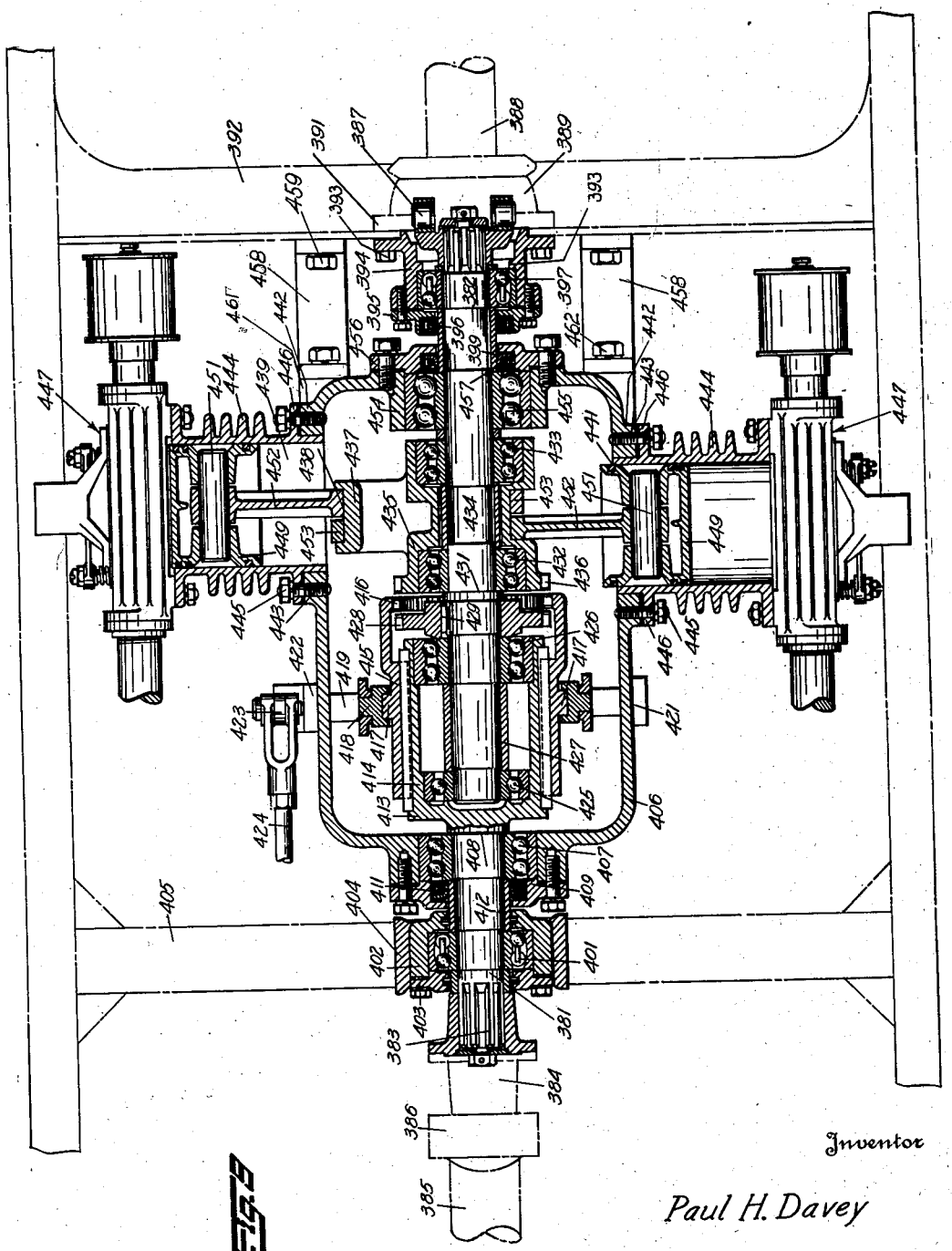

Patented Aug. 18, 1936

2,051,784

UNITED STATES PATENT OFFICE 2,051,784

POWER TAKE-OFF AND ASSOCIATED MECHANISM

Paul H. Davey, Kent, Ohio

Application December 18, 1933, Serial No. 702,993

19 Claims. (Cl. 180—53)

This invention relates generally to mechanisms employed in connection with power shafts to take off power for the operation of air compressors, welding generators and like power units, and more particularly to such mechanisms and their manner of mounting in connection with the drive shaft of an automotive vehicle.

Prior mechanisms of this type have usually involved a support for the take-off device immediately upon the vehicle frame or chassis or on members attached thereto in a manner such that they become an integral part of the frame or chassis, a sliding gear construction in some cases being directly supported on a casing which amounts to a pillow block. In such constructions, the take-off unit is compelled to positively follow the truck frame or chassis in its weaving during road travel and as a result, the bearings and associated elements of the unit are subjected to undue stresses which materially decrease their life and increase the possibility of the unit becoming inoperative or breaking down at any time. Inasmuch as such units when employed in connection with automotive vehicles are generally used on remote jobs far from repair shops, it is evident that the dependability and long life thereof becomes an important factor in the overall efficiency of the vehicle and its attached unit or units.

My present invention, which is an improvement over the device disclosed in my copending application, Serial No. 675,152, filed June 10, 1933, Patent No. 2,014,797, issued September 17, 1935, overcomes this disadvantage of the prior art structures in that the drive shaft of the automotive vehicle which passes through the power take-off is substantially rigidly supported by the frame of the vehicle as is desirable, yet my improved take-off unit is mounted with the requisite flexibility to permit it to yield and accommodate itself to the weave of the vehicle frame during road travel and to the varying distortion of the vehicle frame under different loads. My improved take-off and its associated mechanism is also designed to transmit the full power available in the prime mover, and readily adjust itself when put into operation when the supporting vehicle is so positioned that the frame thereof is distorted from normal alignment. This self adjustment is accomplished by the provision of self-aligning supporting means in connection with the power take-off whereby any reasonable amount of weaving and warping of the truck frame may take place without damage to the unit or its supporting bearings, and by novel internal construction permitting an overall contraction and expansion of the unit. My improved power take-off unit thus becomes an essentially independent transmission unit capable of self adjustment to varying positions relative to the truck frame, and has the further advantage that it frees the power take-off from the necessity of exact alignment with the drive shaft of a truck on which it is mounted, which has been an ever-present problem in the previous designs of such units. In most prior devices wherein the transmission mechanisms are confined to a supporting case, the size and arrangement of gears therein must of necessity be confined within definite limits which seriously limit the power that can be transmitted thereby, whereas with the present invention a relatively wide latitude is afforded in such selections. My present invention is also a marked improvement over the device disclosed in my prior application in that a more compact and less expensive assembly of mechanism for example, such as an air compressor and a power take-off device, is provided in a manner that leaves the full normal cargo space of the truck for use as desired. My present invention has a further advantage in that it affords a compact unit for association with the drive shaft of a truck whereby two or more power converting units may be driven simultaneously or the vehicle may be driven together with the simultaneous operation of a power converting unit located thereon.

Accordingly, it is a major object of my invention to provide a novel power take-off means through which the full prime mover power may be efficiently transmitted, that may be readily installed on automotive vehicles now in use or built into such vehicles in the course of construction thereof in a manner such that it may be considered an essentially independent transmission unit that will stand up under the shock of road travel, and weaving and distortion of the vehicle frame for a period considerably in excess of the usual life of prior units.

A further object of my invention is to provide a novel power take-off device that is supported in connection with the drive shaft of a truck or like vehicle through an arrangement whereby the necessity for exact alignment with the drive shaft is eliminated and the take-off is maintained in a semi-floating state whereby it may accommodate itself to distortion and weaving of the truck frame without the application of undue and harmful stresses to the bearings of the take-off or their associated structure.

Still a further object of my invention is to provide novel supporting means in connection with a power take-off unit on a truck drive shaft and truck frame, the supporting means being of a design to support the take-off in a semi-floating relation while yet supporting and maintaining the drive shaft in the preferred substantially rigid relation, thus permitting the take-off to yield and accommodate itself to weaving and warping of the truck frame during road travel and under different loads.

A further object of my invention is the provision of a novel power take-off arranged to be mounted on the frame of a truck or similar vehicle, the mounting and the take-off being of novel character whereby the take-off is supported in a universal, self-aligning, semi-floating relation with respect to the supporting frame, the take-off being characterized by its ability to adjust itself with respect to length to thereby avoid undue strains set up due to changes in alignment.

Another object of my invention is to provide a novel power take-off adapted for use in connection with a truck or like vehicle, and for support on the frame thereof, novel supporting means being provided between the truck frame and the take-off whereby the take-off is maintained in self-aligning and semi-floating relation with respect to the truck frame, and novel internal construction being provided within the take-off for self-adjustment as to relatively small variations in length occasioned by changes in alignment to prevent the set up of internal strains in the elements of the take-off with a substantial decrease in the life and dependability thereof.

Still a further object of my invention is the provision of a power take-off of novel design particularly adapted for insertion in a power or drive shaft, the take-off comprising two shafts in general alignment with one another and the drive shaft, with the spaced ends of the take-off shafts being supported in self-aligning means, the closer ends of the two shafts being arranged to be rotatably supported in adjacent relation in a manner to permit a limited amount of relative longitudinal movement therebetween whereby the take-off is maintained in a semi-floating, self-aligning relation to the supporting frame, and is capable of self-adjustment to varying lengths in accordance with changes in alignment.

A further object of my invention is to provide a novel power take-off particularly adapted for insertion in a power or drive shaft, the take-off comprising a split shaft with novel means to maintain the axes of the split portions in fixed relation to one another as by an arrangement with the adjacent ends of the split sections rotatably supported by each other at at least two points in telescopic relation and the spaced ends being supported in self-aligning bearing means mounted on a suitable base or bases whereby the take-off may adjust itself to changes in alignment of the base or bases in addition to adjusting itself with respect to relatively small changes in length occasioned by the changes in alignment while maintaining its contained mechanism in correct alignment to prevent the development of internal strains.

Another object of my invention is the provision of novel power take-off means in a novel combination with a power converting unit such as a compressor, generator or the like whereby the power converting unit and the take-off therefor may be so positioned with reference to the drive shaft and the frame that there is substantially no sacrifice of the original cargo space.

A further object of my invention is a novel combination of a power unit such as a compressor or generator and the like with a power take-off device whereby the combined unit may be positioned around the drive shaft of a vehicle and supported thereon and on the frame in a manner that permits of the self-alignment and accommodation of the unit to weaving and distortion of the truck frame and entails no sacrifice of cargo space.

A further object is the provision of a novel power take-off device for use particularly in connection with trucks, embodying a selective clutch and gear mechanism whereby the power from the drive shaft may be optionally directed either to a power converting unit, to the driving wheels of the truck, or both, novel supporting means from the truck frame and drive shaft being provided whereby the power take-off may yield to align itself in accordance with weaving of the truck frame during road travel while the drive shaft is maintained in its desired position.

My invention has as a further object the provision of novel power take-off means in combination with a selective clutch and gear mechanism, adapted to transmit the full available power of the prime mover, the whole being of compact design and capable of insertion in a drive shaft, countershaft or the like and being designed to yield to the distortion and flexing of such a shaft without resulting harm to the take-off means or a reduction in its efficiency.

Another object of my invention is the provision of a novel power take-off means designed to be positioned adjacent driving and driven shafts and mounted thereon for relative movement in such manner that exact alignment need not be maintained therebetween for proper and efficient operation, novel self-aligning supporting means being provided in connection with the take-off to permit a requisite amount of displacement to accommodate distortion of the basic support.

It is still a further object of my invention to provide a power take-off means for insertion in a drive shaft of a truck and having novel clutch and gear mechanism associated therewith whereby one or a plurality of power converting units may be driven therefrom, the truck wheels driven therefrom or both the unit or units and the truck wheels driven simultaneously, the novel design of the take-off means affording a compact, relatively simple assembly, easy to install and characterized, by reason of a novel supporting arrangement, by a desirable yielding to stresses imparted thereto as a result of weaving of the truck frame during road travel.

A further object of my invention is to provide a power take-off of novel design for employment with a sectional or split drive shaft, a novel manner of connecting and supporting the adjacent shaft sections being utilized immediately adjacent the power take-off mounting whereby the reaction thereupon is taken by the split shaft with no consequent distortion by stresses that would tend to decrease the efficiency thereof or reduce its anti-friction characteristics.

Still a further object of my invention is to provide a novel manner of connecting sections of a split propeller shaft through properly lubricated anti-friction means whereby a power take-off may be mounted and driven thereon with no reduction in the power transmitting efficiency of the shaft as a result of the reaction of the power take-off, novel clutching elements being also provided between the propeller shaft and the power take-off at a point immediately adjacent the anti-friction means to further minimize the resultant reaction against the shaft.

A further object of my invention is the provision of a power take-off of novel design together with selective clutch and gear mechanism whereby the construction thereof and the supporting means therefor is such that a relatively wide latitude is afforded for choice in the size and arrangement of gears and the arrangement thereof with the clutching mechanism.

Still a further object of my invention is to provide a novel manner of mounting a power take-off on a truck now in use or during the manufacture thereof whereby existing elements of the frame are utilized to best advantage and the take-off is assured of a semi-floating relation thus affording its accommodation to weaving of the frame during road travel or distortion of the frame due to varying loads, the manner of mounting being relatively simple and inexpensive.

It is still a further object of my invention to provide a novel power take-off in combination with a drive shaft together with improved lubricating means whereby proper lubrication of all the moving parts and their bearings is assured with a resulting increase in life of the take-off.

With the above and other objects in view as will appear from the following description, reference is made to the accompanying drawings wherein:

Figure 1 is a longitudinal diametric section of a preferred power take-off embodying the principles of my invention;

Figure 2 is a second preferred embodiment of my invention shown in longitudinal diametric section;

Figure 3 is a view in longitudinal diametric section of a further preferred embodiment of my invention;

Figure 4 is a view in longitudinal diametric section of a modification particularly applicable to the take-off shown in Figure 3 whereby a power converting unit and a driven shaft may be operated singly or simultaneously by appropriate positioning of the clutch member;

Figure 5 is a further modified form of the take-off of my invention shown in longitudinal diametric section wherein a plurality of means are employed to take power from the drive shaft whereby two or more power converting units may be driven in addition to the driven shaft;

Figure 6 is an elevation showing the manner of installing the take-off of Figure 5 on an automobile truck, the truck being shown in dotted lines;

Figure 9 is a plan view in longitudinal diametric section showing a combined power take-off and power converting unit as associated with the drive shaft of a truck in accordance with the principles of my invention.

Figure 8:
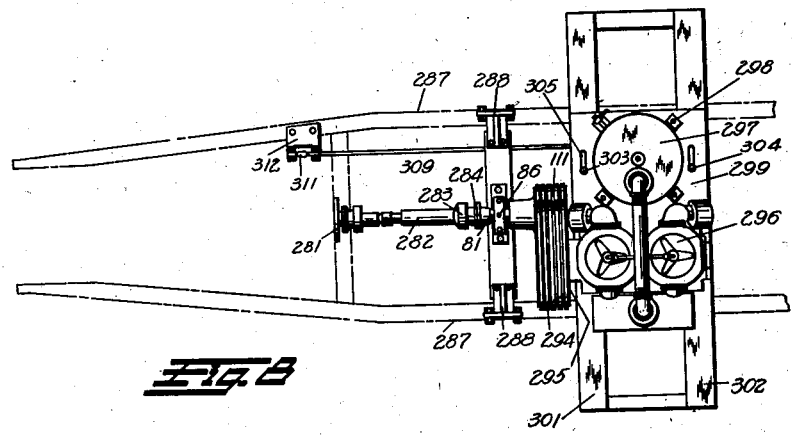
Figure 8 is a plan view of the truck of Figure 7 with the forward part thereof removed to show the chassis or supporting frame.

With specific reference to the embodiment of my invention shown in Figure 1, a power take-off unit is provided which is adapted to be introduced into a countershaft, drive shaft of an automotive vehicle or the like as a part thereof and connected thereto by universal connections at the ends of the unit. This power take-off 11 comprises a drive shaft 12 having a spline 13 on the end thereof in association with an element 14 of a universal joint of suitable design as shown. Drive shaft 12 is connected to a suitable source of power through universal connection 14 such as a shaft extending from the transmission of a motor vehicle.

A driven shaft 15, substantially in alignment with shaft 12, is formed with splines 16 at the end thereof and has a universal joint element 17 suitably secured thereto as shown. Element 17 constitutes a portion of a universal connection to another portion of the drive shaft which, in an automotive vehicle, may be the propeller shaft leading to the differential, and conducting power to the driving wheels.

Shaft 12 is provided adjacent universal 14 with a supporting bearing 18, preferably of the self-aligning type, i. e., the bearing is provided with a race having a surface design such that the bearing support and the shaft may be thrown out of alignment one with another while the bearing continues to operate in its normal manner with no undue stresses thereupon to cramp the bearing or reduce its anti-friction characteristics. Bearing 18 comprises an inner race 19 and an outer race 21 with balls 22 in a suitable cage or retainer 23 between. It will be noted that race 21 is formed with an inner arcuate surface of a curvature having the center of shaft 12 as its origin whereby inner race 19 may be displaced from the normal axis of the bearing and yet not decrease the efficiency thereof. Obviously other types of self-aligning bearings may be employed and it is not intended that the present invention shall be limited to the form described.

Inner race 19 is fixed to shaft 12 through engagement with a shoulder 24 formed on shaft 12 and a spacing washer 25 held in place by universal element 14. A bearing block 26 is provided to engage outer race 21 which is held therein by a block cover 27 suitably threaded, bolted or otherwise secured to block 26. It will be noted that block 26 and its cover 27 are provided with apertures for shaft 12, these apertures being formed to provide a desired amount of clearance for the shaft whereby shaft 12 may be angularly displaced from its normal axis through bearing 18 without contacting the portions of the bearing block. A suitable support such as pillow block 28 is provided for connection to the frame in the case of an automotive vehicle and lubricating means for bearing 18 is provided in the form of a suitable grease fitting 29 of conventional type leading into a hole 30. To prevent the escape of lubricant, packing rings 31 are inserted in suitable grooves in block 26 and its cover 27, respectively, and contact with shaft 12.

Shaft 15, adjacent universal connection 17, is supported in a bearing 32 of the self-aligning type which comprises a bearing block 33 supporting an outer race of a bearing 34. Since this bearing is preferably of the same type as bearing 18, no detailed description thereof is deemed necessary. Bearing 34 is retained within block 32 by a cover 35 suitably fastened to the block as by cap screws 36. Shaft 15 is supported with reference to bearing 32 by a shoulder 37 in combination with a spacing collar 38 and a spacing collar 39 held in place by universal member 17.

A flange 41 is preferably integrally secured to bearing 32 to afford means of fastening to a frame member 42 of an automotive vehicle (shown in dotted lines) or other means of support. Suitable lubrication means is provided through a suitable grease fitting 43 leading into a hole 44 formed in the bearing block. Lubricant retaining means in the form of retainers or seals 45 and 46 of well known construction are placed in grooves formed in block 33 and its cover 35, respectively. It will be noted that the apertures in block 33 and cover 35 accommodating shaft 15 and its collars are of a size to afford considerable angular displacement of shaft 15 from its axis.

The construction as thus far described, when embodied in a motor vehicle, provides an essentially independent transmission in the drive shaft between the universal ahead of the forward self-aligning bearing and the universal joint in back of the rear self-aligning bearing. This particular feature is important in that it affords means whereby the power take-off is maintained as a more or less semi-floating unit with regard to the drive shaft and the vehicle frame. This has not been true of former structures wherein bearings of conventional type have been employed together with associated structure permitting of no give or flexibility in accordance with the weaving and warping of the vehicle frame during road travel. This has resulted in a cramping of the bearing elements of prior structures which not only materially decreases the efficiency of the bearing and hence the power output of the take-off but in some cases results in damage of the bearing to an extent where the entire unit is forced out of commission until the bearing can be replaced. The manner of support described herein overcomes these disadvantages in that the self-aligning elements allow the take-off to give and accommodate itself to distortion of the supporting frame with no consequent cramping of the bearings or decrease in their efficiency. Self-aligning bearings as employed herein have been found to be particularly advantageous in connection with the adjacent universal connections to the drive shaft and a power take-off of dependable character and relatively long life has been obtained. It is to be further noted that the advantageous support of the take-off is obtained with no consequent ill-effect to the drive shaft nor any disturbance to its normally desired substantially rigid positioning. If this were not the case, the provision of a semi-floating take-off might tend to permit the drive shaft more freedom in its action thus resulting in whipping and undesirable vibration.

Shaft 12 is formed at its right end with an integral flange 45 carrying a cylindrical shaped extension or sleeve 46 at its outer extremity in alignment with the axis of the shaft. Sleeve 46 is provided upon its outer surface with splines 47 which are engaged by corresponding splines 48 on the interior of a sliding sleeve 49 which is arranged with a projection 51 to be engaged by any conventional shifting means such as a fork (not shown). If desired, sleeves 46 and 49 may be connected by a key or keys in proper relation with suitable keyways. Splines 48 on sleeve 49 extend only a portion of the length thereof, an unsplined portion 52 being provided between the end of splines 48 and an interior annular gear 53.

The interior of sleeve 46 is suitably recessed to provide supports for bearings 54 and 55, preferably of the ball type, which are separated by a spacing collar 56. Lubricant retaining means is provided for the interior of sleeve 46 by an annular groove 57 in the end thereof and a collar 58 arranged to accommodate a suitable grease retainer 59 therebetween. A fitting 61 leading to a hole 62 is provided for the introduction of lubricant.

Shaft 15 is arranged to extend within sleeve 46 and terminate therein, a rotatable support therefor being formed by bearings 54 and 55 as shown whereby shafts 12 and 15 are maintained in substantially exact alignment. It will be noted that this construction provides means whereby the axes of the respective shafts or sections are maintained in fixed relation to one another as by the arrangement illustrated whereby the inner ends of the drive shaft and the driven shaft are telescopically arranged and are rotatably supported by each other at at least two points of support. Not only does this construction permit overall changes of length of the take-off arising from the changes in alignment resulting from distortion of the supporting frame by reason of clearances in the order of machine clearances provided in association with the respective shoulders and bearings, but it also affords a support at at least two points along the two shafts whereby the shafts and their associated mechanism within the take-off are maintained in alignment to prevent the cramping of any bearing elements or the developing of stress on the mechanism due to distortion of the supporting frame. This feature is also important in that it does away with the necessity for a case or housing to maintain the shafts in alignment thereby materially reducing the cost of the take-off and the weight thereof.

A gear 63 is provided on shaft 15 immediately adjacent collar 58 and is suitably keyed to the shaft as indicated at 64 to rotate therewith. This gear is positioned and is of a size to engage gear 53 on sleeve 49 when the sleeve is slid to the proper position.

To the right of gear 63 on shaft 15, a portion of increased diameter is provided to form two shoulders, 65 and 66. Shoulder 65 assists in holding gear 63 in place and shoulder 66 aids in the holding of a bearing 67. A second bearing 68 is spaced from bearing 67 by a spacing collar 69 and contacted on its opposite side by spacing collar 38. Bearings 67 and 68 are preferably of the ball type.

A grooved pulley, gear or like power transmitting element 71 is provided to rotate on bearings 67 and 68 and is arranged to transmit power to a power converting unit of any type desired.

An annular member 72 is provided at the right end of pulley 71 and suitably bolted thereto to help retain bearing 68 in position and to support a grease retainer 73 bearing against collar 38. At the left end of pulley 72, a member 74 is provided to abut against bearing 67 and to support a grease retainer 75 against shaft 15, member 74 being additionally provided with an annular gear 76 of a size to mesh with gear 53. A fitting 77 leads into a lubricant channel 78 and a distributing chamber 79 in pulley 71 to insure an adequate supply of lubricant to the bearings at all times.

In the operation of the power take-off, the drive is from shaft 12 to either shaft 15 or pulley 71. If it is desired to drive shaft 15, sleeve 49 is slid to the left of the position shown in Figure 1 whereupon gears 53 and 63 are engaged. The chain of power transmission will then be through shaft 12, flange 45, sleeve 46, spline 47, spline 48, sleeve 49, gear 53, gear 63, and key 64 to shaft 15 and from there to the wheels of the vehicle if the take-off be employed in that connection.

If it is desired to drive pulley 71 and in turn a power converting unit that may be mounted upon the vehicle or remote therefrom, sleeve 49 is slid to the right of the position shown in Figure 1 whereupon gear 53 engages gear 76. The chain of drive will then be through shaft 12, flange 45, sleeve 46, spline 47, spline 48, sleeve 49, gear 53 and gear 76 to pulley 71.

In the position shown in Figure 1, the power take-off is in neutral position and neither shaft 15 nor pulley 71 can be driven from shaft 12.

It will be noted that the above described power take-off involves compact, simple and efficient construction which admits of ready installation, assembly and disassembly. It is particularly adapted for installation upon automotive vehicles such as repair trucks carrying compressors, generators and like power converting units as part of their equipment where it is desirable to use the one power plant for both locomotion of the vehicle and operation of the power converting unit or units.

With reference to Figure 2 of the drawings, there is illustrated therein a more compact form of power take-off wherein the length is materially reduced, and the take-off may be inserted in a relatively short length of a drive shaft. A drive shaft 81 leading from a prime mover or other source of power is aligned with a driven shaft 82 leading to the driving wheels of the vehicle. Both shafts may be formed with splines at their end portions for suitable connection to other shafts through universal connections or the like. Shaft 81 is supported adjacent its left end in a self-aligning bearing 83 mounted in a bearing block 84 which in turn may be supported upon a pillow block 85 secured to the frame of the vehicle. Suitable lubrication is afforded through a grease fitting 86.

Shaft 82 is formed adjacent its right end with a portion 87 of reduced cross section about which is mounted a bearing 88 of the self-aligning type. A cylindrical annulus 89 is provided for the support of bearing 88, bearing 88 being maintained therein by a locking ring 91 fitting into a notch 92 in the inner surface of annulus 89 and a cover 93 fastened to the annulus as by a threaded connection 94. To insure the retaining of cover 93 in place against the rotation of shaft 82, a locking cap screw 95 may be passed through a hole in cover 93 to engage a threaded hole in annulus 89. Annulus 89 is formed with an annular flange 96 apertured for the reception of bolts, rivets or the like for connection to a corresponding flange on the driving wheel shaft connection. Means may be provided for the introduction of lubricant adjacent the splined end of shaft 82 and a lubricant retainer 97 is provided in cover 93. It will be noted that with both bearings 83 and 88, sufficient clearance in the supporting means is provided whereby shafts 81 and 82 may be angularly displaced with reference to their normal axes and not be cramped or locked thereagainst with resulting undesirable friction.

Shaft 81 is provided with a portion 98 of increased diameter having a hollow core 99 therein. A portion 101 of further increased diameter is provided with a hollow center 102 to form a cylindrical sleeve hereinafter designated as 101. Sleeve 101 is recessed in its interior to form bearing supports for bearings 103 and 104, preferably of the ball type. Shaft 82 terminates within and is mounted to rotate in bearings 103 and 104 in sleeve 101 and is formed with an integral gear 105 immediately adjacent bearing 104. A grease retainer 106 is preferably provided in bearing 104.

Shaft 81 has mounted thereon on its portion 98, bearings 107 and 108, preferably of the ball type, which support a pulley 109 having sleeve 111 or suitable gearing thereon to transmit power to a power converting unit usually located on the vehicle. A spacing collar 112 is provided in conjunction with locking elements 113 and 114 to space bearings 107 and 108, bearing 107 being otherwise held in place by a spacing collar 115 on shaft 81 and bearing 108 abutting against the end of sleeve 101. An annulus 116 with a gear thereon is bolted or otherwise secured to pulley 111 as shown. Sleeve 101 is splined on its outer surface to engage with corresponding interior splines on a sliding sleeve 117 provided with a notched collar 118 adjacent the right end thereof and adapted to be engaged by suitable operating means such as a fork (not shown). Collar 118 is preferably secured to sleeve 117 by cap screws 119. Sleeve 117 is formed at its left end with a gear 121 of a size to engage gear 116 and is further provided with a grease retainer 122 arranged to contact annulus 89.

In the position of sleeve 117 shown in Fig. 2, the unit is in neutral position with no drive to either shaft 82 or pulley 111. If it is desired to drive shaft 82 from shaft 81, sleeve 117 is shifted to the right until the interior splines thereon engage gear 105, the teeth of which are formed to fit the splines. Drive will then be through shaft 81, sleeve 101, sleeve 117, and gear 105 to shaft 82. If it is desired to drive pulley 111 from shaft 81, sleeve 117 is shifted to the left whereby gear 121 engages gear 116 and drive takes place through shaft 81, sleeve 101, sleeve 117, gear 121 and gear 116 to pulley 111.

Lubrication for the entire unit aside from the self-aligning bearings at the ends thereof is enabled by means of a single fitting 123 delivering lubricant into the space between the pulley and collar 112, whereby bearings 107 and 108 are lubricated. A conduit 124 leading to core 99 conducts lubricant to bearings 103 and 104.

In Figure 3 I have illustrated still a further embodiment of any invention wherein a drive shaft 131 is provided in conjunction with a driven shaft 132, which, if the unit be mounted upon an automotive vehicle leads to the driving wheels thereof. The power take-off illustrated is designed to be inserted in the drive shaft of a motor vehicle and accordingly a splined portion 133 is provided on shaft 131 to engage a connecting flange 134 in fixed relation, flange 134 in turn being connected to the transmission of the motor vehicle through suitable means.

A bearing 135 of the self-aligning type is provided to abut against a shoulder 136 formed on shaft 131, the bearing being held in place by a bearing block 137 formed with a threaded cover 138. Block 137 is arranged to be supported on the frame of the vehicle. Means for introducing lubricant to the bearing is shown at 139 and lubricant retaining gaskets 141 and 142 are positioned in the bearing block and its cover to prevent the escape of the lubricant about shaft 131. A suitable clearance is provided in the shaft holes through both the bearing block and its cover plate whereby the shaft may be angularly displaced with reference to its normal axis and yet avoid contact therewith.

Shaft 132 is formed with a splined portion 143 thereon which engages an element 144 of a universal joint (not shown) in fixed relation whereby a universal connection may be established with a shaft leading to the driving wheels of the truck. A bearing 145 is provided immediately adjacent the universal connection, the bearing being of the self-aligning type. Bearing 145 is retained in its position on the shaft by a shoulder 146 thereon and universal element 144 in conjunction with suitable spacing washers. A retaining annulus 147 is provided to the left of bearing 145 and contains a lubricant retainer 148 in engagement with shaft 132. Annulus 147 is connected to a sleeve 149 through cap screws 151, sleeve 149 being designed to engage the outer race of bearing 145 and clamp it against annulus 147. A flange 152 is provided on sleeve 149 for engagement with a suitable supporting element of the vehicle frame as indicated in dotted lines at 153. In this instance, no lubricant seal is provided in connection with the right of the bearing since the universal joint, preferably employed, is sealed against the escape of lubricant at its connection to the shaft going to the driving wheels of the vehicle.

It will be noted that the unit as thus far described embodies self-aligning means at its point of support by the vehicle frame whereby the latter may weave and warp during the course of road travel with no damage to or impairment of the efficiency of the power take-off.

Shaft 131 is formed with a flange 154 carrying a sleeve or shell 155 at its outer periphery. Sleeve 155 is formed with a spline upon its outer surface which engages a like spline on a sliding sleeve 156. Sleeve 156 is formed with a notch 157 arranged to be engaged by a fork or any suitable operating means and is further formed at its right end with an interior annular gear 158 which serves a purpose to be later described. Sleeve 156 is recessed upon its inner surface to form supports for two spaced bearings 159 and 161, preferably of the ball type. Bearings 159 and 161 serve to support the adjacent end of shaft 132 in rotatable relation to sleeve 155, shaft 132 having an annular gear 162 keyed or otherwise secured thereto in nonrotatable relation at 163, gear 162 also serving by means of its engagement with a shoulder 164 on shaft 132 to hold bearing 161 in position. Bearing 161 is provided with a grease retainer 165.

A sleeve 166 in the nature of a spacing member is mounted on spaced enlarged portions 167 and 168 of shaft 132 and serves to space two like bearings 169 and 171, preferably of the ball type. A power transmitting element 172 is mounted to rotate on bearings 169 and 171 and may be formed as a pulley with driving sheaves 173 as shown or a gear or any suitable means for the transmission of power to a power unit. Pulley 172 is formed with an integral flange 174 at its left end to which is secured as by bolts 175, an annular gear 176 which is designed to engage gear 158. A threaded portion 177 is provided on shaft 132 in conjunction with a nut 178 which serves to lock bearing 171 in place and hence maintain pulley 172 in its proper position.

Means for lubricating sleeve 155 and the mechanism associated therewith is provided by a fitting 179 in conjunction with a conduit 181, a lubricant fitting 182 being also provided on pulley 172 with a corresponding conduit for lubrication purposes. Grease retainers 183 and 184 are provided in bearings 169 and 171, respectively.

In operation of this take-off, power may be transmitted from shaft 131 either to pulley 172 or shaft 132. If it be desired to drive shaft 132 and the driving wheels of the vehicle, sleeve 156 is moved to the left to engage gears 158 and 162. Power will then be transmitted through shaft 131, flange 154, sleeve 155, sleeve 156, gear 158, gear 162 and key 163 to shaft 132. If it be desired to drive pulley 172, sleeve 156 is moved to the right until gear 158 engages gear 176. Drive will then take place through shaft 131, flange 154, sleeve 155, sleeve 156, gear 158, gear 176, and flange 174 to pulley 172.

In this embodiment of my invention and in the others described herein, it is to be noted that the spaced bearings in the sleeve of the drive shaft for rotatable support of the end of the driven shaft are particularly important since they maintain the continued anti-friction qualities of the assembly in spite of the reaction thereon due to the belts or ropes that may be passing around pulley 172 and exerting a pull thereon upon one side only. The adjacent location of the shaft connection and the mounting of the pulley thereon together with the adjacent positioning of the clutching elements limits the stresses imposed upon the unit by reason of the pulley drive to a relatively small portion thereof and at a point where there is ample resistance.

In Figure 4, I have shown a modified form of the power take-off shown in Figure 3 in the respect that means is provided for driving either the driven shaft or the power unit singly or simultaneously from the same drive shaft. Similar reference characters for corresponding parts are employed throughout and detailed portions of the self-aligning bearings have been omitted for the sake of brevity.

Driven shaft 131 is supported in self-aligning bearing 135 and connects through flanges 154 with sleeve 155 having bearings 159 and 161 mounted therein to rotatably support the adjacent end of driven shaft 132. Sleeve 155 is formed with a splined outer surface. Gear 162 is keyed to shaft 132 at 163 to rotate therewith. Bearings 169 and 171 are mounted on shaft 132 and spaced thereon by collar 166 with pulley 172 rotatably mounted thereon. Shaft 132 is supported at its right end in bearing 145 with preferably the same manner of connection to the vehicle frame as shown in Figure 3.

Pulley 172 is formed with a flange 174 and an annular gear 191 is secured thereto as by bolts 175. It will be noted that the gear proper is spaced from flange 174 to provide a space 192 equal to or greater than the width of the gear. A sliding sleeve 193, with a portion of its interior surface splined, is disposed to slide on sleeve 155 and has a peripheral notch 194 thereon arranged to be engaged by a suitable shifting fork not shown. An internal gear 195 of a width of approximately twice the width of gears 162 and 191 is provided on sleeve 193.

When it is desired to drive only shaft 132 from shaft 131, sleeve 193 is placed in the position shown in Figure 4. If it is desired to drive only pulley 172, sleeve 193 is moved to the far right whereby only gears 191 and 195 are engaged. If it is desired to drive both pulley 172 and shaft 132, sleeve 193 is positioned so that gear 195 engages both gears 162 and gear 191 in which case both pulley 172 and shaft 132 will be driven.

A power take-off as just described is of particular advantage when it is desired to operate both a power unit and the supporting vehicle at the same time as, for instance, a spray truck in the operation of which the truck is moving along the line of plants or trees to be sprayed and power is being simultaneously furnished to a spray pump, the truck being driven through shaft 132 and the spray pump through pulley 172.

In Figure 5, I have shown a still further preferred form of a power take-off embodying the principles of my invention wherein means is provided for driving a plurality of power converting units from the same drive shaft in addition to driving a driven shaft that may be connected to the driving wheel of a vehicle.

A drive shaft 201 is provided in connection with a driven shaft 202, shaft 201 being splined and a flange 203 being connected thereto whereby shaft 201 may be placed in power transmitting connection with a suitable source of power such as a shaft 204 leading from the transmission of a motor vehicle and connected through a suitable universal connection 205. Shaft 202 is likewise splined at its end as at 206 for connection to a universal joint element 207 leading to the driving wheels of the vehicle through a shaft 208 and through a universal joint shown diagrammatically at 209.

A self-aligning bearing 211 is provided adjacent the end of shaft 201 for support by the frame of the vehicle and a similar self-aligning bearing 212 is provided adjacent the end of shaft 202 for support by the vehicle frame. Inasmuch as these bearings and their manner of connection to and support by the frame of the vehicle have been described in detail in connection with Figures 1, 2 and 3 and their construction is believed quite obvious from the drawings, a repeated detailed description thereof at this point is deemed unnecessary other than to state that they permit the power take-off to give and accommodate itself to weaving of the vehicle frame during road travel whereby no undue stresses are placed upon the bearings and the length of life of the take-off is accordingly prolonged.

Shaft 201 is provided with a flange 213 having a sleeve 214 extending from its outer periphery. Sleeve 214 supports bearings 215 and 216 on its interior, preferably of the ball type, which are spaced by a collar 217, the end of shaft 202 being mounted in bearings 215 and 216 for rotation relative to sleeve 214. A lubricant fitting 218 leads into a conduit 219 opening into the interior of the sleeve and a suitable lubricant retainer 221 is provided adjacent the end of sleeve 214.

Sleeve 214 is splined upon its exterior surface and a sliding sleeve 222 having corresponding splines is mounted thereon. Sleeve 222 has a portion of enlarged diameter with an internal gear 223 mounted thereon. A circumferential notch 224 is provided on sleeve 222 for engagement by a shifting fork or other suitable means (not shown) for sliding the sleeve.

Shaft 202 has a gear 225 keyed thereon at 226 arranged to engage gear 223 and also provided with shoulders 227 and 228 to support grease retainers 221 and 229 respectively.

Bearings 231 and 232, preferably of the ball type, are mounted on shaft 202, and spaced thereon by a collar 233. Bearings 231 and 232 support a sleeve 234 in rotatable relation to shaft 202 to which sleeve a pulley member 235 is integrally secured. Sleeve 234 extends to the left of bearing 231 to support lubricant retainer 229.

A gear 236 is mounted on sleeve 234 and suitably keyed thereto with an abutting locking collar 237 fastened to sleeve 234 as by screws 238. Proper lubrication is provided for bearings 231 and 232 and their associated elements by a grease fitting 239 leading into conduit 241 which connects with a groove 242 in the bearing supporting surface of sleeve 233 for bearing 232. A grease retainer 243 is provided in connection with a flange collar 244 for preventing the escape of lubricant.

A second pair of bearings 245 and 246 are provided on the exterior of sleeve 234 to support a second pulley 247. An annulus 248 is suitably secured to the left side of pulley 247 by cap screws 249 or other suitable means and a gear 251 is formed integral therewith. It will be noted that suitable spacing collars are provided in connection with pulley 247 and bearings 245 and 246 whereby collar 237 maintains pulley 247 and its assembly on sleeve 234. A lubricant fitting 252 is provided leading into conduit 253 which in turn leads to a groove 254 in the supporting surface for bearing 246, thereby providing means for the access of lubricant to the bearings. Grease retainers are provided as at 255 and 256.

In operating the power take-off of Figure 5, it is possible to drive either of the pulleys or shaft 202. If shaft 202 is to be driven, sleeve 222 is moved to the left until gear 223 engages gear 225, when drive will take place through shaft 201, flange 213, sleeve 214, sleeve 222, gear 223, gear 225, and key 226 to shaft 202. If pulley 235 is to be driven, sleeve 222 is moved to the right until gear 223 engages gear 236. The drive will be through shaft 201, flange 213, sleeve 214, sleeve 222, gear 223, gear 236, and sleeve 234 to pulley 235. If pulley 247 is to be driven, sleeve 222 is moved further to the right until gear 223 engages gear 251 when drive will take place through the usual channels through gear 223, and gear 251 to pulley 247.

It will be noted that the power take-off just described provides a simple, compact and efficient assembly whereby either of the power converting units or the driven shaft may be driven. Such an arrangement is desirable on a truck where the truck is not only to be driven but the power of converting units such as a compressor and a generator mounted thereon are also to be driven. In actual practice, it has been possible to utilize the rear driving sheave with its four grooves to drive an air compressor of approximately 120 cubic feet piston displacement while the forward driving sheave has driven an electric welding generator of apparently 200 ampere capacity. Such an assembly permits an operator to take the combined compressor-generator equipment to a repair job and provide compressed air for the operation of air tools or electrical power for the operation of welding equipment.

The advantages of such a construction are even more apparent when former devices are reviewed. With a single power take-off, to obtain power for two power converting units, it was necessary to drive to a counter-shaft which carried two separate drives operated through a double twin disc drive clutch. My invention eliminates the countershaft, the twin disc clutch and one system of drive connections. The overall assembly is also rendered more compact and more cargo space is afforded in the vehicle by the elimination of all the driving mechanism above the truck frame.

In connection with the power take-off of Figure 5, it is to be understood that it may readily be designed to drive additional power converting units by the addition, for instance, of another driving pulley which in turn would be operated through another sleeve extending beneath the two sleeves indicated in the drawings.

In Figure 6, I have shown the power take-off of Figure 5 as installed on a truck, the truck being indicated in dotted lines. Shaft 204 leads from the transmission of the truck to universal joint 205 which is connected through flange 203 to shaft 201 rotatably mounted in self-aligning bearing 211. Bearing 211 is supported on a cross frame member 261 secured at its ends to the frame of the vehicle. A fork 262, pivoted at 263, is arranged to engage pins 264 on sleeve 222 to slide the sleeve and control the delivery of the take-off. Universal 209 and the associated self-aligning bearing 212 are connected to the frame of the vehicle by a depending member 265, shaft 208 leading therefrom to the driving wheels of the truck.

Pulley 247 is connected by suitable belts 266 to a pulley 267 arranged to drive a generator 268. Pulley 235 is connected by suitable belts 269 to a pulley 271 arranged to drive an air compressor 272, a tank 273 being provided in connection with the compressor.

It will be noted that the method of installation of my improved power take-off is relatively simple and the manner of support in conjunction with the self-aligning bearings permits a considerable amount of warping and weaving of the frame of the truck during road travel with no consequent damage to the power take-off since the latter is supported in a manner such that it can give and will maintain its efficiency even under considerable angular displacement of its axis from the normal position thereof. No material modifications are involved in the truck structure, the construction being such that it can be easily taken care of by the average mechanic. It is to be further noted that all power transmission to the belts of the different power converting units and to the driving wheels is located entirely beneath the truck frame whereby the power converting units may be located at the forward portion of the body and substantially the normal cargo space will be available.

To increase the efficiency of power delivery, the power axes of the power converting units are preferably disposed substantially parallel to the axes of the pulleys delivering the power. This is taken care of in the present instance by selection of the proper shape and size of unit supporting beams 274 and 275 on the truck frame.

Figure 7:
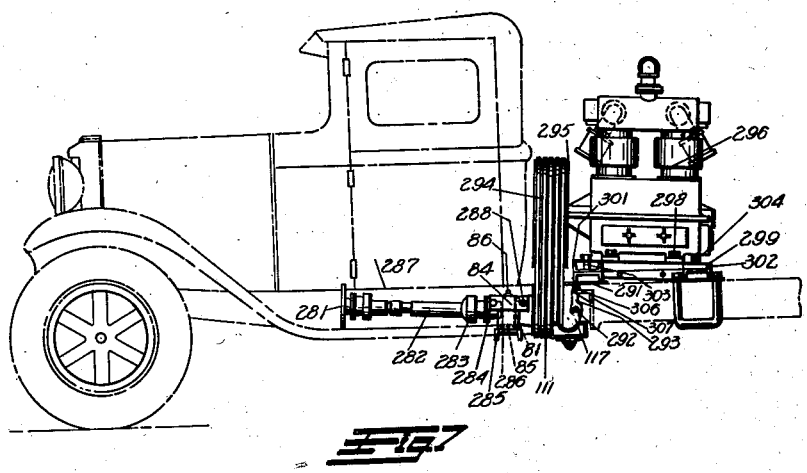
Figure 7 is an elevation showing the manner of installing the take-off of Figure 2 on an automobile truck, the truck being indicated in dotted lines.

In Figures 7 and 8, I have illustrated a method and manner of installing the power take-off of Figure 2 on a truck or similar vehicle in connection with a compressor. A shaft 282 is provided leading from the transmission 281 of the truck (shown in dotted lines) to a universal joint 283 secured by a flanged connection 284 to drive shaft 81. Shaft 81 is supported in self-aligning bearing in bearing block 84 which in turn is supported by pillow block 85 bolted or otherwise suitably secured to a cross channel 285. Suitable shims 286 may be employed to facilitate proper positioning of the block. Channel 285 is connected to side channels 287 of the truck frame by L-shaped brackets 288, bolted, riveted or otherwise fastened. A self-aligning bearing for the rear support of the take-off may be attached to the frame of the truck by a flanged connection of the type generally illustrated in Figure 1. Sliding sleeve 117 in the modification shown has diametrically opposed pins 292 arranged for engagement with a shifting fork 293, whereby power may be directed either to pulley 111 or the driving wheels of the truck.

Pulley 111 is connected by a series of driving belts 294 with a pulley 295 driving a compressor 296 in conjunction with a storage tank 297. Compressor 296 and tank 297 are attached as by bolts 298 to a supporting plate 299, plate 299 being supported from the truck frame by cross members 301, and 302 having bolts 303 and 304 attached thereto, respectively. Slots 305 are formed in plate 299 through which bolts 303 and 304 pass and suitable nuts are provided for fastening plate 299 in position. The slotted construction permits the sliding of the entire compressor unit whereby the unit may be adjusted on the truck frame to maintain belt 294 at the proper tension for an efficient transmission of power. It will be noted that beam 301 is somewhat higher than beam 302 in order that the axis of the compressor unit may be maintained substantially parallel to the axis of the power take-off.

Operating fork 293 is fastened to a shaft 306 to rotate therewith and is supported by a bracket 307. Shaft 306 connects with a lever (not shown) located at one side of the frame which in turn is connected to a connecting rod 309. Rod 309 connects with a lever 311 pivoted in a bracket 312 disposed at the front of the vehicle whereby shifting fork 293 may be operated from the driver's seat. If desired, lever 311 may be also connected to operate desired valves on the compressor unit simultaneously with engagement and disengagement of the power take-off.

In Figure 9, I have shown still a further embodiment of the principles of my invention wherein a power converting unit is mounted around a power take-off inserted in a suitable drive shaft, the overall assembly being relatively compact, simple to assemble and disassemble and mounted in combination with self-aligning means whereby the entire unit is supported in a semi-floating relation to the frame of the truck and is able to yield and give to weaving and warping of the truck frame during road travel. It will be further noted that the novel character of this assembly avoids the necessity of power transmitting pulleys with belt connections therebetween and affords a positive, direct drive with substantially no loss of power and no requirement for continued adjustment.

In Figure 9, a drive shaft 381 is positioned substantially in alignment with a driven shaft 382, shaft 381 being connected through a spline and shaft 384 coupled to flange connection 383 with a shaft 384 coupled to a shaft 385 leading from a suitable source of power such as the transmission of a truck through a universal 386. Shaft 382 is splined to a fork 387 of a universal joint which connects with a shaft 388 leading to a unit to be driven, or in the case of a truck to the differential driving the wheels. A cover 389 is suitably mounted on shaft 388 and connected by a flange 391 to a supporting cross member 392 on the truck frame. Connection of cover 389 to member 392 is obtained by cap screws 393 passing through suitable holes in member 392. Cap screws 393 also pass through suitable holes in a bearing support 394 to which an apertured cover plate 395 containing a grease retainer 396 is suitably bolted or otherwise fastened. A bearing 397 of the self-aligning type is supported by support 394 and held in place by a flange 398 and cover plate 395. It will be noted that the aperture in cover plate 395 is larger than an adjacent spacing collar 399 on shaft 382 whereby shaft 382 may be angularly displaced with reference to its normal axis and still not be unduly cramped and held in frictional engagement with portions of its related assembly whereby the efficiency of the unit may be reduced.

A self-aligning bearing 401 is provided in connection with shaft 381 and is supported in a bearing block 402 in turn provided with an apertured cover plate 403. Block 402 is suitably supported on a pillow block 404 suitably secured to a cross member 405 on the truck frame. Suitable means may be employed for the introduction of lubricant and lubricant retaining washers are preferably employed as illustrated in connection with both the bearing block and its cover plate.

A housing 406 of substantially cylindrical shape is provided around shafts 381 and 382 and supports a bearing 407, preferably of the ball type, at its left end to support shaft 381, bearing 407 being held in place by a shoulder 408 on shaft 381 and a cover plate 409 bolted or otherwise suitably secured to housing 406. Cover plate 409 supports a grease retainer 411 in contact with a collar 412 mounted on shaft 381 to space bearings 401 and 407.

Shaft 381 is formed with an integral flange 413 having a sleeve 414 integral therewith at its outer periphery, sleeve 414 being splined on its outer surface to engage complementary splines on the inner surface of a sliding sleeve 415 that is formed with an interior annular gear 416 at its right end. Sleeve 415 is formed with diametrically projecting pins 417 engaging the inner terminus 418 of an operating fork 419 pivotally mounted in housing 406 at 421 and 422 and connected to a lever 423 in connection with a connecting rod 424 leading to a lever or other operating means preferably in the cab of the truck.

Sleeve 414 has two bearings 425 and 426 therein, preferably of the ball type, and spaced apart by collar 427 on shaft 382. Shaft 382 is rotatably supported in these bearings and adjacent bearing 426 has a gear 428 suitably keyed thereto to rotate therewith at 429.

A shoulder 431 is formed on shaft 382 adjacent key 429 abutted by a bearing 432. Bearing 432 is spaced from a second bearing 433, by a spacing collar 434. Both bearings are preferably of the ball type. A sleeve 435 having a gear 436 at the left end thereof is mounted to rotate on bearings 432 and 433 and carries an eccentric 437 at its midportion, eccentric 437 being formed with an annular groove 438 therein.

Housing 406 is provided with two openings 439 and 441 therein, the axes of which are offset with respect to one another for a purpose to be later described. Flanges 442 are provided around holes 439 and 441 with threaded lugs 443 projecting therefrom. Cylinders 444 are suitably secured to flanges 442 by nuts 445 in conjunction with flanges 446 on the cylinders. Suitable valve control means, air inlet and outlets together with cooling means, all generally indicated at 447, are provided in connection with cylinders 444 but as they form no part of the present invention, a detailed description thereof is deemed unnecessary.

Pistons 449 are provided within cylinders 444 to compress the air therein and are connected through wrist pins 451 with connecting rods 452 to eccentric straps 453 operating in annular groove 438 in the eccentric or cam member 437. Straps 453 are located side by side, hence the necessity for openings 439 and 441 with their associated cylinders being slightly out of line with one another as heretofore described.

Housing 406 is provided at its right end with a flange 454 supporting a bearing 455 held in position by a cover plate 456 provided with a grease retainer 457 contacting with collar 399.

To prevent the compressor from exerting a tendency to rotate with the shaft upon which it is mounted, braces 458 are connected to frame member 392 through bolts 459 and to brackets 461 and housing 406 through bolts 462 or other suitable fastening means.

Lubrication for the self-aligning bearings may be supplied through suitable grease fittings while lubrication for the structure within housing 406 is preferably assured by a sump pump (not shown) thus assuring force feed to all moving parts.

In operating the combined power take-off and compressor of Figure 9, if it is desired to drive shaft 382 and in turn the driving wheels of the vehicle, sleeve 415 is shifted to the left until gear 416 engages gear 428. Drive then takes place through shaft 381, flange 413, sleeve 414, sleeve 415, gear 416, gear 428, and key 429 to shaft 382. If it is desired to operate the air compressor, sleeve 415 is shifted to the right until gear 416 engages gear 436 whereupon drive takes place through shaft 381, flange 413, sleeve 414, sleeve 415, gear 416, gear 436, eccentric 437, straps 453, connecting rods 452 and wrist pins 451 to pistons 449.

The above described combination not only is compact and simple in construction but is also characterized by increased efficiency in that transmission of power is accomplished with a minimum of intermediate agents. Moreover, the entire assembly is so mounted by reason of the self-aligning bearings that it may readily accommodate itself to distortion of the truck frame and no cramping or destruction of the supporting bearings results.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A power take-off arranged to form a part of a drive shaft in an automotive vehicle comprising a driven shaft; means to support said shaft from said vehicle comprising a self-aligning bearing at the point of support; a driving shaft in alignment with said driven shaft; means to support said driving shaft from said vehicle comprising a self-aligning bearing at the point of support; means to support said driving shaft in concentric relation to said driven shaft comprising bearing means mounted on said driven shaft; a power transmitting element rotatably mounted on said driven shaft and means to optionally connect said driving shaft to said driven shaft or said power transmitting element.

2. A power take-off arranged to form part of a drive shaft in an automotive vehicle comprising a driving member arranged to be driven from the prime mover of the vehicle; a sliding sleeve secured thereto in non-rotatable relation; a driven member connected to the driving wheels of said vehicle and mounted to rotate in alignment with said driving member; a second driven member mounted to rotate relative to said first driven member and arranged to drive a power converting unit; a third driven member mounted to rotate relative to said second driven member and arranged to drive a second power converting unit; and means to directly connect said sleeve with either of said driven members to drive said vehicle or operate any of said power converting units.

3. In a power take-off, a power transmitting element; a shaft divided into at least two sections, the first of said sections being arranged to receive power from a suitable source; a sleeve on the end of said first section; spaced anti-friction means within said sleeve arranged to receive and rotatably support the adjacent end of said second section in aligned relationship; means on said second section immediately adjacent said sleeve to rotatably support said power transmitting element; a shiftable clutch element on said sleeve arranged to rotate therewith; and complementary clutching elements on said second section and said power transmitting element arranged to engage said clutch element, said clutching elements being positioned immediately adjacent said sleeve connecting said sections.

4. In a power take-off unit arranged to be inserted in a drive shaft on a vehicle; a split shaft, one section of said shaft being arranged to receive power from said drive shaft; a second section arranged to be driven from said first section; supporting means adjacent the outer ends of said sections and attached to said vehicle, said supporting means being subject to stresses under working conditions effecting distortion and misalignment of the elements thereof and of the associated elements of said vehicle and comprising means to support said power take-off unit in universal relation to said vehicle to insure proper operation of said unit despite said distortion and misalignment effected by stresses; and mechanical means between said supporting means to maintain the axes of said sections in fixed relation to one another.

5. In a power take-off unit arranged to be inserted in a drive shaft on a vehicle; a split shaft, one section of said shaft being arranged to receive power from said drive shaft, a second section arranged to be driven from said first section, and supporting means adjacent the outer ends of said sections and attached to said vehicle, said supporting means being subject to stresses under working conditions effecting distortion and misalignment of the elements thereof and of the associated elements of said vehicle and comprising self-aligning means to support said power take-off unit in universal relation to said vehicle to insure proper operation of said unit despite said distortion and misalignment effected by stresses, said sections being provided at their inner ends with means comprising a plurality of spaced bearings to maintain the axes of said sections in mutual linear alignment.

6. In a power take-off unit arranged to be inserted in a drive shaft on a vehicle; a split shaft, one section of said shaft being arranged to receive power from said drive shaft, a second section arranged to be driven from said first section, the inner ends of said sections being mounted in concentric relation to one another; supporting means adjacent the outer ends of said sections and attached to said vehicle, said supporting means being subject to stresses under working conditions effecting distortion and misalignment of the elements thereof and of the associated elements of said vehicle and comprising self-aligning bearings to support said power take-off unit in universal relation to said vehicle to insure proper operation of said unit despite said distortion and misalignment effected by stresses; and mechanical means to maintain said inner ends of said sections in substantially rigid linear alignment, said ends being arranged for relative axial movement therebetween whereby the overall length of said power take-off may vary in accordance with its change of axis in said self-aligning bearings.

7. In a power take-off unit arranged to be inserted in a drive shaft on a vehicle; a split shaft, one section of said shaft being arranged to receive power from said drive shaft; a second section arranged to be driven from said first section, the inner ends of said sections being mounted in concentric relation to one another; means to transmit power from said first section to a power converting unit, said means being subject to stresses approximately normal to the axis of said power take-off unit; supporting means adjacent the outer ends of said sections and attached to said vehicle, said supporting means being subject to stresses under working conditions effecting distortion and misalignment of the elements thereof and of the associated elements of said vehicle, and comprising means to support said power take-off unit in universal relation to said vehicle to insure proper operation of said unit in spite of said distortion and misalignment effected by stresses; and mechanical means to maintain said inner ends of said sections in alignment with one another to prevent binding of the elements of said power take-off unit by reason of the stresses imposed on said power transmitting means.

8. In a power take-off unit, a power transmitting element; a shaft divided into at least two sections, the first of said sections being arranged to receive power from a suitable source; a relatively elongated sleeve on the end of said first section; anti-friction means within said sleeve adjacent the ends thereof and arranged to engage a relatively elongated portion of a second section and rotatably support said second section in aligned relationship to said first section; means to rotatably support said power transmitting element on one of said sections; a shiftable clutch element on said sleeve arranged to rotate therewith; and complementary clutching elements on said second section and said power transmitting element arranged to engage said shiftable clutch element, said clutching elements being positioned immediately adjacent the connection between said sections.

9. In a power take-off unit mounted upon the frame of a vehicle, said frame being subject under working conditions to distortion and misalignment, a power transmitting element; a shaft divided into at least two sections, the first of said sections being arranged to receive power from a suitable source; a sleeve on the inner end of one of said sections; spaced anti-friction means within said sleeve arranged to receive and rotatably support the inner end of another section in aligned relationship; means adjacent the outer ends of said sections to rotatably secure said sections to said vehicle frame in universal relation thereto to prevent binding of said sections by reason of distortion and misalignment of said frame; means to rotatably support said power transmitting element on one of said sections; and means on said sleeve and positioned immediately adjacent the connection between said sections to selectively couple said first section with either said second section or said power transmitting element.

10. In a power take-off unit arranged for insertion in a drive shaft on a vehicle as a part thereof and arranged to be mounted upon the frame of said vehicle, said frame being subject under working conditions to distortion and misalignment; a power transmitting element; a shaft divided into at least two sections, the first of said sections being arranged to receive power from a portion of said drive shaft; a sleeve on the inner end of one of said sections; spaced anti-friction means within said sleeve arranged to receive and rotatably support the inner end of another section in aligned relationship; means adjacent the outer ends of said sections to secure said sections to said vehicle frame in universal relation thereto to prevent binding of said sections by reason of distortion and misalignment of said frame; means to rotatably support said power transmitting element on one of said sections; and means on said sleeve and positioned immediately adjacent the connection between said sections to selectively couple said first section with either said second section or said power transmitting element.

11. In a power take-off unit, a power transmitting element; a shaft divided into at least two sections, the first of said sections being arranged to receive power from a suitable source, a relatively elongated sleeve on the end of one of said sections; anti-friction means within said sleeve arranged to contact the adjacent end of a second section at a plurality of longitudinally disposed points and rotatably support the adjacent end of said second section in aligned relationship to said first section; means to rotatably support said power transmitting element on one of said sections; and clutching means on said sleeve and positioned immediately adjacent the connection between said sections to selectively connect said first section with either said second section or said power transmitting element or both.

12. In a power take-off unit arranged to be mounted upon the frame of a vehicle, said frame under working conditions being subject to distortion and misalignment; a power transmitting element; a shaft divided into at least two sections; the first of said sections being arranged to receive power from a suitable source; a sleeve on the inner end of one of said sections; anti-friction means within said sleeve arranged to receive and rotatably support the inner end of another section in aligned relationship; means adjacent the outer ends of said sections to rotatably secure said sections to said vehicle frame in universal relation thereto to prevent binding of said sections by reason of distortion and misalignment of said frame; means to rotatably support said power transmitting element on one of said sections; and clutching means on said sleeve and positioned immediately adjacent the connection between said sections to selectively connect said first section with either said second section or said power transmitting element or both.

13. In a power take-off unit arranged for insertion in a drive shaft as a part thereof, a plurality of power transmitting elements; a shaft divided into at least two sections, one of said sections being arranged to receive power from said drive shaft; a sleeve on one of said sections; spaced anti-friction means within said sleeve arranged to receive and rotatably support the adjacent end of a second section in aligned relation; means to rotatably support said power transmitting elements on one of said sections; and means on said sleeve and positioned immediately adjacent the connection between said sections to couple said first section with said second section or either of said power transmitting elements.

14. In a power take-off unit arranged for insertion in the drive shaft of a motor vehicle as a part thereof and arranged to be mounted upon the frame of said vehicle, said frame being subject under working conditions to distortion and misalignment; a plurality of power transmitting elements; a shaft divided into at least two sections; one of said sections being arranged to receive power from a suitable source; a sleeve on one of said sections; anti-friction means within said sleeve arranged to receive and rotatably support the adjacent end of a second section in aligned relation; means adjacent the outer ends of said sections to rotatably secure said sections to said vehicle frame in universal relation thereto to prevent binding of said sections by reason of said distortion and misalignment of said frame; means to rotatably support said power transmitting elements on one of said sections; and means on said sleeve and positioned immediately adjacent the connection between said sections to couple said first section with said second section or either of said power transmitting elements.

15. In a power take-off unit arranged for insertion in a drive shaft; a plurality of power transmitting elements; a shaft divided into at least two sections, one of said sections being arranged to receive power from one portion of said drive shaft and function as a driving section of said power take-off and a second of said sections being arranged to transmit power to the second portion of said drive shaft to drive the same and function as a driven section of said power take-off; a sleeve on one end of one of said sections; spaced anti-friction means within said sleeve arranged to receive and rotatably support the adjacent end of a second section in aligned relationship; means on said second section to rotatably support one of said power transmitting elements; means on said power transmitting element to rotatably support a second power transmitting element; and means to couple said driving section to said driven section or either of said power transmitting elements.

16. In a power take-off unit arranged for insertion in a drive shaft; a plurality of power transmitting elements; a shaft divided into at least two sections, one of said sections being arranged to receive power from one portion of said drive shaft and function as a driving section of said power take-off and a second of said sections being arranged to transmit power to a second portion of said drive shaft to drive the same and function as a driven section of said power take-off; means to maintain said sections in aligned relation; means on said driven section to rotatably support one of said power transmitting elements; means on said power transmitting element to rotatably support a second power transmitting element; and means to couple said driving section to said driven section or either of said power transmitting elements.

17. In a power take-off unit arranged for insertion in a drive shaft; a plurality of power transmitting elements; a shaft divided into at least two sections, one of said sections being arranged to receive power from one portion of said drive shaft and function as a driving section of said power take-off, and a second of said sections being arranged to transmit power to the second portion of said drive shaft to drive the same and function as a driven section of said power take-off; a sleeve on the end of one of said sections; spaced anti-friction means within said sleeve arranged to receive and rotatably support the adjacent end of a second section in aligned relationship; means on said driven section to rotatably support one of said power transmitting elements; means on said power transmitting element to rotatably support a second power transmitting element; a shiftable clutch element on said driving section arranged to rotate therewith; and complementary clutching elements on said driven section and on said power transmitting elements to engage said shiftable clutch element, said clutching elements being positioned immediately adjacent the connection between said sections.

18. In a power take-off unit arranged for insertion in a drive shaft on a vehicle and arranged to be mounted on the frame of said vehicle which is subject under working conditions to distortion and misalignment; a plurality of power transmitting elements; a shaft divided into at least two sections, one of said sections being arranged to receive power from one portion of said drive shaft and function as a driving section of said power take-off, and a second of said sections being arranged to transmit power to the second portion of the drive shaft and drive the same and function as a driven section of said power take-off; means to maintain said sections in aligned relation; means adjacent the ends of said sections to support said power take-off unit from said frame in self-aligning relation thereto to permit operation thereof when said vehicle is distorted or misaligned; means on said driven section to rotatably support one of said power transmitting elements; means on said power transmitting element to rotatably support a second power transmitting element; and means to couple said driving section to said driven section or either of said power transmitting elements.

19. In a power take-off unit arranged for insertion in a drive shaft on a vehicle as a part thereof, a power transmitting element; a shaft divided into at least two sections, the first of said sections being arranged to receive power from one portion of said drive shaft; a relatively elongated sleeve positioned on the inner end of one of said sections; anti-friction means within said sleeve adjacent the ends thereof arranged to engage a relatively elongated portion of a second section and rotatably support the inner end of said second section in aligned relationship to said first section; means to rotatably support said power transmitting element on one of said sections; and means on said sleeve and positioned immediately adjacent the connection between said sections to selectively couple said first section with either said second section or said power transmitting element.

PAUL H. DAVEY.